Figure 1:
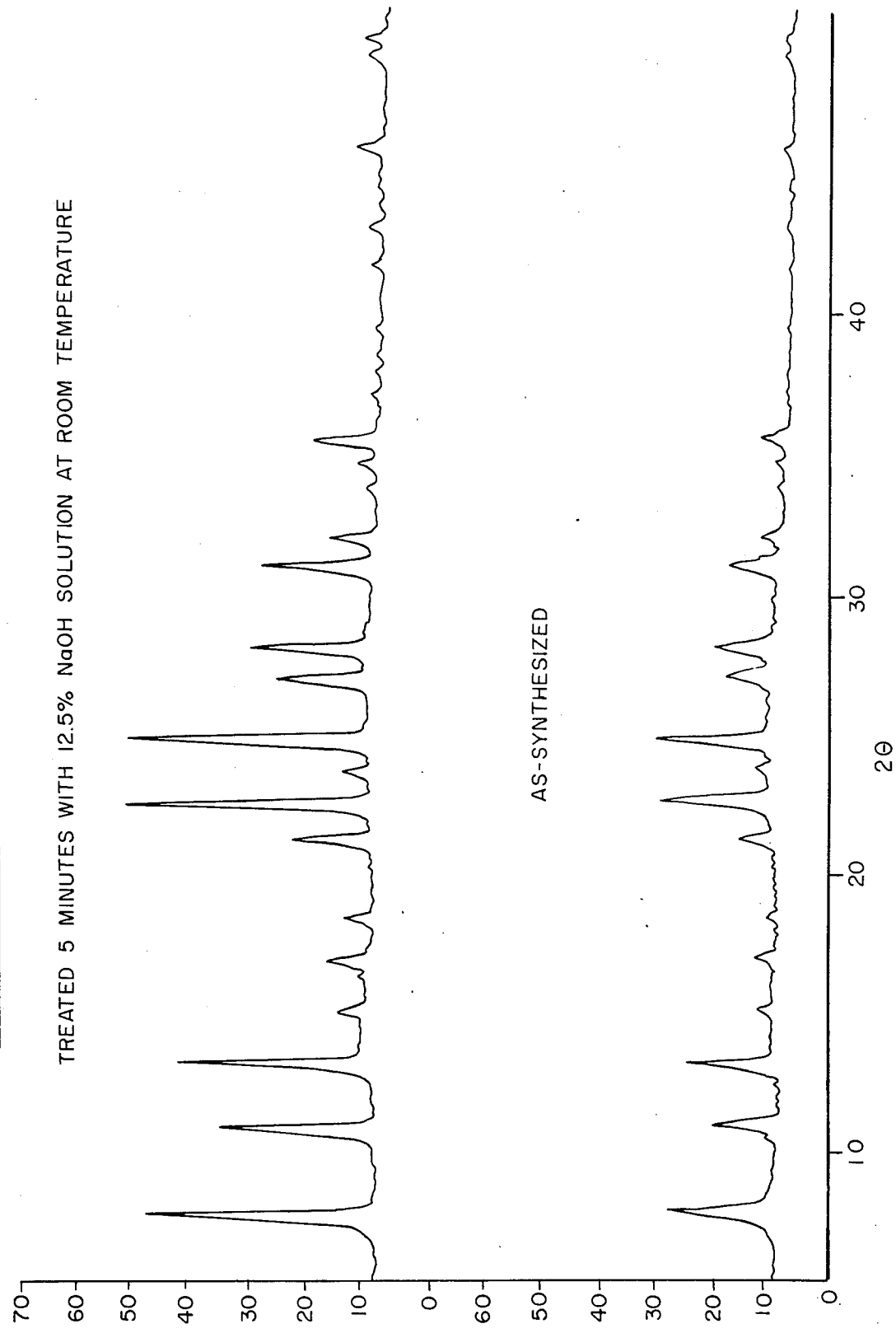

United States Patent [19]

Kokotailo et al.

[11] Patent Number: 4,703,025

[45] Date of Patent: Oct. 27, 1987

[54] METHOD FOR PURIFYING ZEOLITIC MATERIAL

[75] Inventors: George T. Kokotailo, Woodbury; Albert C. Rohrman, Jr., Gibbstown, both of N.J.

[73] Assignee: Mobil Oil Corporation, New York, N.Y.

[21] Appl. No.: 16,449

[22] Filed: Feb. 24, 1987

Related U.S. Application Data

[63] Continuation of Ser. No. 774,515, Sep. 10, 1985, abandoned.

[51] Int. Cl.$^4$ .................. B01J 29/06; C10B 33/28
[52] U.S. Cl. .................................. 502/60; 502/62; 423/328
[58] Field of Search .................. 502/60, 62; 423/328

[56] References Cited

U.S. PATENT DOCUMENTS

| | | | |
|---|---|---|---|
| 4,134,965 | 1/1979 | Rein et al. | 423/328 |
| 4,260,495 | 4/1981 | Bennoit et al. | 423/328 |
| 4,497,786 | 2/1985 | Chu et al. | 423/328 |
| 4,524,055 | 6/1985 | Onodera et al. | 423/328 |

*Primary Examiner*—Carl F. Dees
*Attorney, Agent, or Firm*—A. J. McKillop; M. G. Gilman; L. P. Hobbes

[57] ABSTRACT

A method for purifying zeolitic materials comprising a plurality of solid crystalline phases is disclosed which utilizes the variation in solubility between the phase components comprising the materials. Impure zeolite is contacted with a caustic solution under conditions which dissolve at least one of the phases and the resulting zeolitic material is filtered and washed to produce a purified product.

19 Claims, 3 Drawing Figures

METHOD FOR PURIFYING ZEOLITIC MATERIAL

This is a continuation of copending application Ser. No. 774,515, filed on Sept. 10, 1985 now abandoned.

This invention relates to a method for purifying impure zeolitic materials which comprise a plurality of solid crystalline phase including at least one zeolite phase, of varying solubility in the presence of hydroxide ion. Phases of lower solubility are removed from the zeolitic material by contacting the impure zeolitic material with a solution having hydroxide ion concentration of at least about 0.25 moles per liter so as to substantially solubilize at least one but not all of the phases making up the impure material. Thereafter the material is washed and filtered to remove more soluble phases from the sample and to recover the remaining insoluble materials.

Zeolitic materials, both natural and synthetic, have been demonstrated in the past to have catalytic capabilities for various types of hydrocarbon conversion reactions, especially catalytic cracking. Certain of these zeolitic materials comprise ordered porous crystalline aluminosilicates having a definite crystalline structure, as determined by X-ray diffraction, within which there are a large number of small cavities, which are interconnected by a series of still smaller channels or pores. These cavities and pores are precisely uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of the adsorptive properties of these compositions.

These molecular sieves include a wide variety of positive ion-containing crystalline aluminosilicates, both natural and synthetic. Among the synthetic zeolites are those known as A, X, Y, L, D, R, S, T, Z, E, F, Q, and B. All can generally be described as having a rigid 3-dimensional network of $SiO_4$, and $AlO_4$ in which the tetrahedra are crosslinked by the sharing of oxygen atoms whereby the ratio of the total aluminum and silicon atoms to oxygen atoms is 1:2. The electrovalence of the tetrahedra containing aluminum is negatively charged and the composition is balanced by the inclusion in the crystal structure of a cation, for example an alkali metal or an alkaline earth metal cation. Thus, a univalent positive sodium cation balances one negatively charged aluminosilicate tetrahedra. Where an alkaline earth metal cation is employed in the crystal structure of an aluminosilicate, it balances two negatively charged aluminosilicate tetrahedra because of its doubly positive valence. Other compositions in the aluminosilicate family contain both double positive cations, e.q. calcium and univalent positive cations, e.g. sodium, and are prepared, for example, by base exchanging a sodium aluminosilicate with a calcium compound solution such that not all of the sodium ions are removed. By means of such cation exchange, it has been possible to vary the size of the pores in the given aluminosilicate by suitable selection of the particular cation. The spaces between the tetrahedra are occupied by molecules of water prior to dehydration.

Other materials which may be treated in accordance with the present invention include highly siliceous zeolites, that is, zeolites having a silica to alumina molar ratio of at least about 10. Such zeolites include large pore zeolites such as zeolite X, zeolite Y, mordenite, zeolite beta, ZSM-3, ZSM-4, ZSM-18 and ZSM-20, as well as medium pore zeolites such as ZSM-5, ZSM-11, ZSM-5/ZSM-11 intermediates, ZSM-12, ZSM-23, ZSM-35, ZSM-38, ZSM-48 and other similar materials.

Zeolite X is described in greater detail in U.S. Pat. No. 2,882,244, incorporated herein by reference. Zeolite Y is described in greater detail in U.S. Pat. No. 3,130,007. The entire description contained within this patent, particularly the X-ray diffraction pattern of therein disclosed Zeolite Y, is incorporated herein by reference.

Zeolite beta is described in U.S. Pat. No. 3,308,069. That description, including the X-ray diffraction pattern of zeolite beta, is incorporated herein by reference.

ZSM-3 is described in greater detail in U.S. Pat. No. 3,415,736. That description, and in particular the X-ray diffraction pattern of said ZSM-3, is incorporated herein by reference.

ZSM-4 is described in U.S. Pat. No. 4,021,447. That description, and in particular the X-ray diffraction pattern disclosed therein, is incorporated herein by reference.

ZSM-5 is described in greater detail in U.S. Pat. Nos. 3,702,886 and Re 29,948. The entire descriptions contained within those patents, particularly the X-ray diffraction pattern of therein disclosed ZSM-5, are incorporated herein by reference.

ZSM-11 is described in greater detail in U.S. Pat. No. 3,709,979. That description, and in particular the X-ray diffraction pattern of said ZSM-11, is incorporated herein by reference.

ZSM-5/ZSM-11 intermediate compositions are described in U.S. Pat. No. 4,229,424. That description, and in particular the X-ray diffraction pattern of said compositions disclosed therein, is incorporated herein by reference.

ZSM-12 is described in U.S. Pat. No. 3,832,449. That description, and in particular the X-ray diffraction pattern disclosed therein, incorporated herein by reference.

ZSM-18 is described in U.S. Pat. No. 3,950,496. That description, and in particular the X-ray diffraction pattern disclosed therein, is incorporated herein by reference.

ZSM-20 is described in U.S Pat. No. 3,972,983. The entire content thereof, particularly the specification of the X-ray diffraction pattern of the disclosed zeolite, is incorporated herein by reference.

ZSM-23 is described in U.S. Pat. No 4,076,842. The entire content thereof, particularly the specification of the X-ray diffraction pattern of the disclosed zeolite, is incorporated herein by reference.

ZSM-35 is described in U.S. Pat. No 4,016,245. The description of that zeolite, and particularly the X-ray diffraction pattern thereof, is incorporated herein by reference.

ZSM-38 is more particulary described in U.S. Pat. No, 4,046,859. The description of that zeolite, and particularly the specified X-ray diffraction pattern thereof, is incorporated herein by reference.

ZSM-48 is more particularly described in U.S. Pat. No. 4,234,231, the entire content of which is incorporated herein by reference.

Impure zeolites which comprise a plurality of solid crystalline phases can often result from conventional zeolite synthesis techniques. Impure synthetic zeolites may also contain amorphous materials in addition to crystalline materials of varying stability, including other zeolites. This is especially true in the synthesis of new materials which may be poorly crystalline and may be mixtures. The characterization of these impure zeolite materials is generally quite burdensome owing to varying stabilities of their components as well as the effects on X-ray diffraction which each phase contributes, preventing the elucidation of a clear X-ray diffraction pattern. Moreover, reliable adsorption and diffusion data of a specific zeolite are also subject to the interfering effects of other phases.

It has now been found that impure zeolitic materials, having a zeolitic channel system, which comprise a plurality of solid crystalline phases, including at least one zeolite phase, may be purified by contacting with a caustic solution having a hydroxide ion concentration sufficient to substantially solubilize at least one but not all of the phases within the zeolitic material. The material may then be filtered and washed to remove the dissolved impurities and recover the insoluble, purified material.

It is known in the art to expose a zeolite to conditions of high alkalinity to effect a change therein. For example, U.S. Pat. No. 3,326,797 to Young describes a method for improving the adsorptive capacity and catalytic activity of zeolites such as mordenite by removing structural silica by caustic treatment with solutions having a pH above 10.5. U.S. Pat. No. 3,929,669 to Rosback et al discloses a method for treating zeolites by contacting a precursor mass comprising an amorphous component and a zeolite component with an aqueous caustic solution. The process enhances olefin capacity in the zeolite by removing small amounts of silica and/or alumina. Catalytic activity is also reduced owing to exchange of alkali metal ion for hydrogen ion. U.S. Pat. No. 4,435,516 to Chang et al and U.S. Pat. No. 4,478,950 to Chu teach enhancement of catalytic activity in highly siliceous shape-selective zeolites by treatment with an aluminate solution at high pH. U.S. patent application Ser. No. 774,614, filed Sept. 10, 1985 (now abandoned), teaches contacting a zeolite in aqueous ammonia solution to enhance hydrocarbon sorption. None of the above references teaches a method for purifying impure zeolites which comprise a plurality of solid crystalline phases.

The present invention relates to a method for purifying an impure zeolitic material which contains a plurality of crystalline phases, and optionally, one or more amorphous phases. For the purpose of the present invention the term "phase" can be defined as a material with a characteristic X-ray diffraction pattern which distinguishes it from all other crystalline materials or an amorphous material. Each phase should possess a particular solubility in the presence of hydroxide ion. The impure zeolitic materials purified by the process of the present invention should comprise a phase which can be substantially stabilized or dissolved by a caustic solution having a hydroxide ion concentration of at least about 0.25 moles per liter, preferably at least about 1.0 moles per liter, for example, ranging between about 0.25 to about 25.0 moles per liter. Such solutions may contain aqueous alkali metal hydroxide solutions such as sodium hydroxide, lithium hydroxide or potassium hydroxide. Ammonium hydroxide or organic ammonium hydroxide solutions including tetraalkylammonium hydroxide solutions may also be employed.

It is generally preferred that the treatment with hydroxide ion avoid introduction of the caustic solutions to the zeolite channel system because the rate of dissolution is reduced. Moreover, the possibility of ion exchange between the caustic and zeolite is thereby limited. Furthermore removal of the organic material by calcination before treatment might convert any amorphous material present to a very stable material, e.g., cristobalite, difficult to remove. Accordingly, the treatment of the present invention may preferably be carried out using impure zeolitic materials containing zeolites whose pores or channels are obstructed with organic material. Such materials include as-synthesized zeolites crystallized from forming mixtures which contain organic directing agents. Upon crystallization, the channel systems of such zeolites are obstructed by the directing agent which can be removed by calcination or other suitable methods. Alternatively, zeolites whose channels are not obstructed can be treated with bulky organic hydroxides, e.g., tetraalkylammonium hydroxide such as tetrapropyl ammonium hydroxides. The hydroxide associated with the bulky organic is unable to substantially enter the channel system of the zeolite.

The conditions under which zeolitic material purification is achieved include exposure times ranging between about 5 min. to about 48 hours, preferably between about 1 hr. to about 24 hrs. depending upon hydroxide ion concentration and temperatures ranging between about 20° to about 100° C., preferably between about 20° C. to about 35° C. Pressures may range between about 14.7 psi to about 100 psi, preferably between about 14.7 psi to about 20 psi. The conditions may be adjusted depending on the relative solubilities of the solid phases comprising the impure zeolites. Preferably, the impure zeolite and caustic solution are combined under agitation conditions, e.g. stirring.

The zeolitic material may be purified by contact with a 1 to 50 weight percent, say 12 to about 25 percent aqueous solution of alkali metal hydroxide.

Impure zeolitic materials treated by the present invention contain a plurality of crystalline phases. They may include either different phases of the same zeolite or different zeolites altogether. For example, impure zeolites containing a plurality of phases selected from the group consisting of zeolite beta, mordenite, ZSM-5, ZSM-11, ZSM-5/ZSM-11 intermediate, ZSM-12, ZSM-22, ZSM-23, ZSM-35, ZSM-38 and ZSM-48 zeolites may be employed.

The process of the present invention has been found useful in purifying impure zeolitic materials such as poorly developed crystalline high silica zeolite A, pentasil samples, and mixtures of zeolite beta and mordenite.

The process of the present invention is particularly suited to characterization of newly synthesized zeolites. Exposure of impure zeolites to the above-recited conditions can result in products having unusually well-defined X-ray diffraction patterns of enhanced intensity and resolution, as well as improved catalytic properties due to greater crystallinity and purity of zeolite components. Moreover, adsorption and diffusion properties can be significantly enhanced. Generally, the extent of purification can be determined by comparing the X-ray diffraction pattern of the impure zeolite and resulting product. The process may be repeated and conditions adjusted as necessary to effect dissolving of the undesired phase or phases. Preferably, the remaining insoluble product is filtered and/or washed. The product may thereafter be dried.

Figure 2:
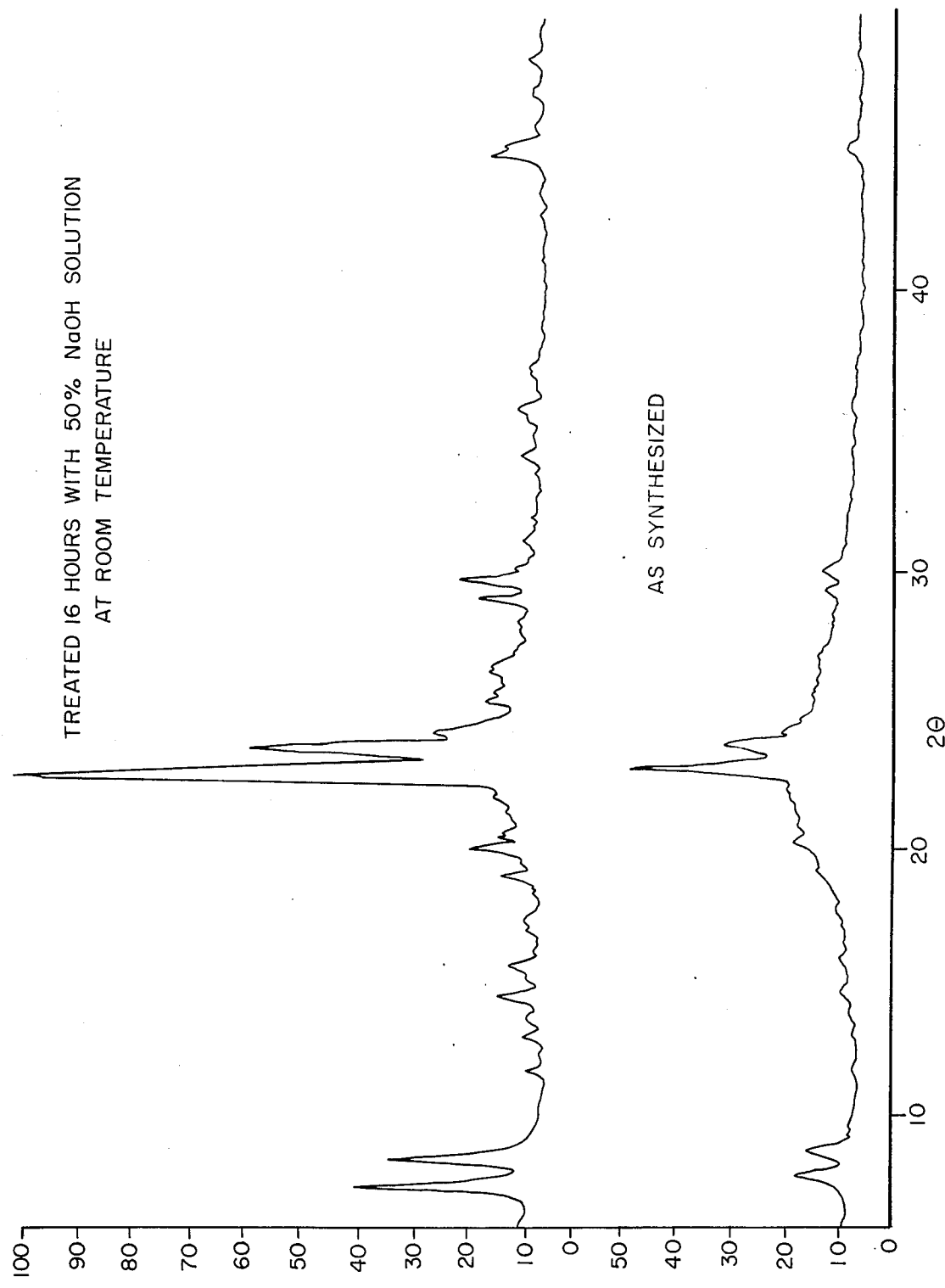

The invention can be further described by the following examples. X-ray diffraction patterns of the as-synthesized samples before and after treatment were obtained using CuK radiation and a Norelco diffractometer and are given in FIGS. 1-3. The concentration of the aqueous hydroxide used was varied depending on the "caustic stability" of each sample for a varying period of time at room temperature if the relative stability of 2 or more components are nearly the same the hydroxide treatment should be chosen to selectively remove the less stable phase.

EXAMPLE 1

A sample of high silica zeolite A type material was prepared by the following protocol:

125 g of sodium silicate (Q brand), were mixed in a blender with 4.8 g NaOH and 32.4 g water. $AlCl_3$ solution (16 g in 216 g water) was added and the resulting mixture stirred for 5 minutes. The resulting slurry was treated 3 hrs. at 100° C. and then filter washed with 1.5 liter distilled water to pH =9. 400 ml of solution containing 200 g $NH_4Cl$ per liter was then passed through followed by 800 ml water. 185 g of the resulting wet cake was combined with 41.0 g tetraethyl ammonium hydroxide (TEAOH) (3.6 moles TEAOH per 1000 g solution) and 4.8 g NaOH and thereafter slurried in a blender and allowed to age in a plastic jar for 24 hrs. The jar was then placed in a 100° C. bath for 10-14 days until crystallization occurred.

The resulting product was treated for 5 minutes with stirring using a 12.5% sodium hydroxide solution, filtered, washed and dried. The X-ray diffraction pattern set out in FIG. 1 indicates an increase of 100% in intensity of the treated sample. Some amorphous material remains which can be removed by further treatment.

EXAMPLE 2

A low crystallinity ZMS-5/11 intermediate was prepared as follows:

A mixture of 75 g Hi-Sil ( 87% $SiO_2$), 1.5 g sodium aluminate, 20 g tetrabutylammonium bromide, 10 g NaCl, 3 g NaOH and 300 g $H_2O$ was crystallized under static conditions in an autoclave at 310° F. for 7 days.

The resulting product was treated for 16 hours with 50% aqueous NaOH at room temperature with stirring. The intensity of the X-ray diffraction pattern, FIG. 2, increased by a factor of 3 and the resolution and quality of the pattern was considerably improved.

EXAMPLE 3

A mixture of zeolite beta and mordenite was synthesized as follows:

A 5-gallon autoclave was charged with 1526 g of Hi-Sil ( 87% $SiO_2$) and 4368 g $H_2O$. A solution of 105 g $NaAlO_2$, 203 g NaOH pellets and 1294 g tetraethylammonium bromide (TEABr) in 3591 g $H_2O$ was added. The mixture was crystallized at 270° F. with 90 rpm stirring. After 259 hrs. the product was mainly mordenite and contained some zeolite beta.

Figure 3:
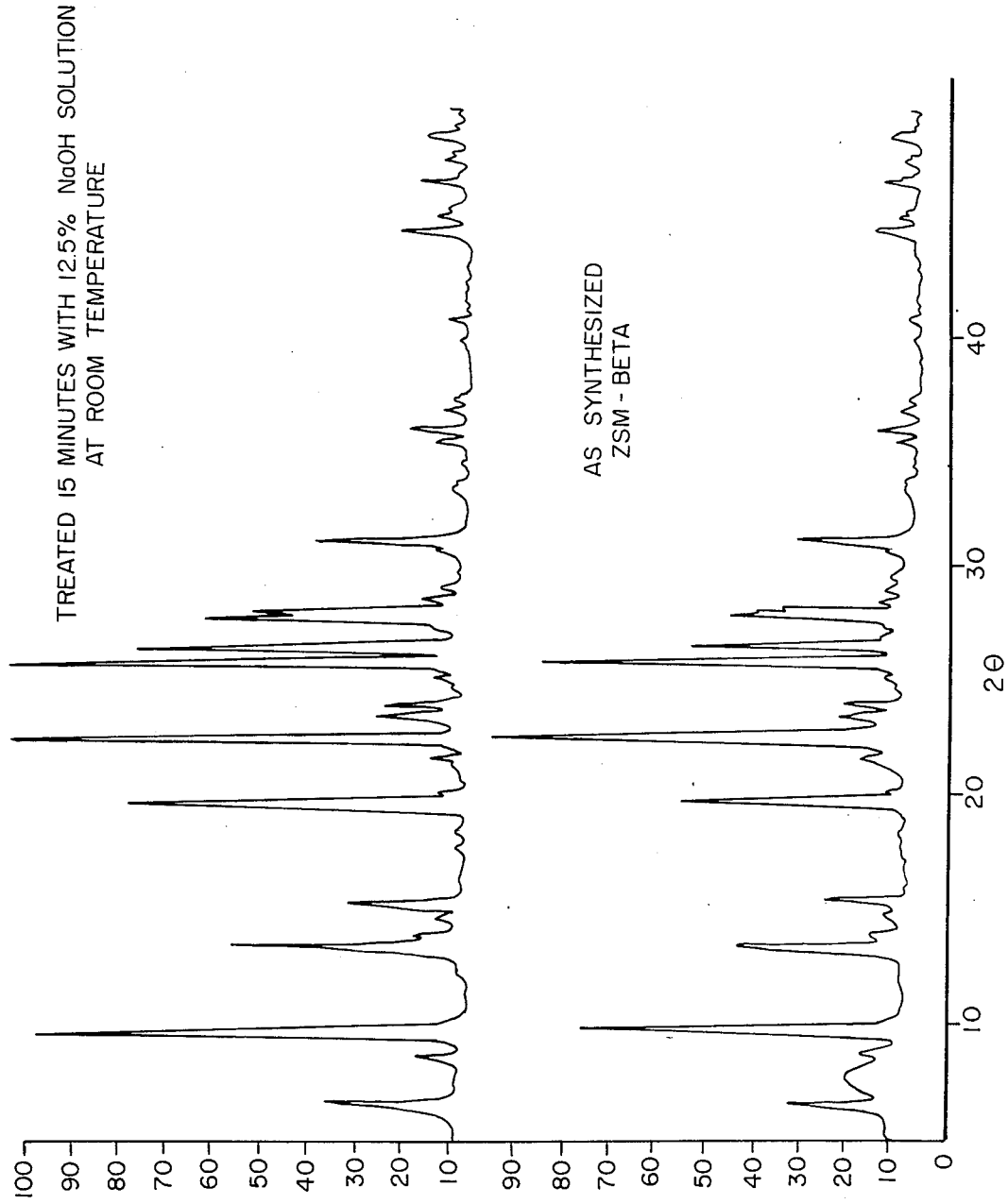

The resulting product was treated for 15 minutes with an aqeuous 12.5% NaOH solution at room temperature with stirring. The X-ray diffraction patterns set out in FIG. 3 showed that the zeolite beta component had been removed with a resultant improvement in the mordenite pattern.

It is claimed:

1. A method for purifying an impure zeolitic material which contains a plurality of crystalline zeolite phases of varying solubility in the presence of hydroxide ion whereby crystalline phases of greater solubility are removed from said zeolitic material which comprises contacting said zeolitic material with an aqueous solution having a hydroxide ion concentration sufficient to substantially solubilize at least one but not all of said phases in such a way that said solution does not substantially enter the zeolitic channel system of said material, and thereafter washing said zeolitic material to remove said solubilized phases.

2. The method of claim 1 wherein said impure zeolitic material contains a channel system which is obstructed with organic material.

3. The method of claim 2 wherein said impure zeolitic material is an as-synthesized zeolite prepared from a forming mixture which contains organic material.

4. The method of claim 1 wherein the hydroxide ion in said solution is associated with an organic moiety of sufficient bulk rendering said hydroxide ion incapable of entering said channel system.

5. The method of claim 4 wherein said organic moiety is tetraalkylammonium.

6. The method of claim 5 wherein said tetraalkylammonium is tetrapropylammonium.

7. The method of claim 1 wherein said solution contains an alkali metal hydroxide.

8. The method of claim 1 wherein said solution contains sodium hydroxide.

9. The method of claim 1 wherein said solution is a 1 to 50 weight percent aqueous solution of alkali metal hydroxide.

10. The method of claim 9 wherein said solution is about 12 to about 25 weight percent alkali metal hydroxide.

11. The method of claim 1 wherein said impure zeolitic material contains at least one amorphous phase which is soluble in the presence of hydroxide ion.

12. The method of claim 1 wherein said impure zeolitic material comprises zeolite beta.

13. The method of claim 1 wherein said impure zeolitic material consists essentially of zeolite beta and mordenite.

14. The method of claim 1 wherein said impure zeolitic material comprises zeolite A.

15. The method of claim 1 wherein said impure zeolitic material contains a component selected from the group consisting of zeolite beta, ZSM-5, ZSM-11, ZSM-5/ZSM-11 intermediate, ZSM-12, ZSM-23, ZSM-35, ZSM-38 and ZSM-48.

16. The method of claim 1 wherein said solution has a hydroxide ion concentration of at least about 0.25 moles per liter.

17. The method of claim 1 wherein said solution has a hydroxide ion concentration of at least about 1.0 moles per liter.

18. The method of claim 1 wherein said contacting occurs at a temperature ranging between about 20° C. and 100° C.

19. A process for purifying an impure zeolitic material containing a plurality of solid crystalline zeolite phases of varying solubilities in the presence of hydroxide ion which comprises contacting the zeolitic material with an aqueous solution consisting essentially of at least about 1.0 weight percent alkali metal hydroxide at a temperature ranging between about 20° to 100° C. for a period of time sufficient to dissolve at least one but not all of said phases, in such a way that said solution does not substantially enter the zeolitic channel system of said material, and thereafter filtering and washing the undissolved product.

* * * * *